(12) United States Patent
Brushkivskyy et al.

(10) Patent No.: US 11,971,103 B2
(45) Date of Patent: Apr. 30, 2024

(54) SEAL DEVICE, ELECTRIC MACHINE, AND DRIVE DEVICE

(71) Applicant: ZF Friedrichshafen AG, Friedrichshafen (DE)

(72) Inventors: Vyacheslav Brushkivskyy, Kressbronn am Bodensee (DE); Gerhard Höring, Hagnau am Bodensee (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 400 days.

(21) Appl. No.: 17/293,211

(22) PCT Filed: Oct. 14, 2019

(86) PCT No.: PCT/EP2019/077695
§ 371 (c)(1),
(2) Date: May 12, 2021

(87) PCT Pub. No.: WO2020/104110
PCT Pub. Date: May 28, 2020

(65) Prior Publication Data
US 2022/0003267 A1    Jan. 6, 2022

(30) Foreign Application Priority Data

Nov. 19, 2018  (DE) .................. 10 2018 219 779.2

(51) Int. Cl.
*F16J 15/16*     (2006.01)
*F16J 15/3204*   (2016.01)
(Continued)

(52) U.S. Cl.
CPC ......... *F16J 15/3204* (2013.01); *F16J 15/164* (2013.01); *H02K 5/124* (2013.01); *H02K 5/14* (2013.01)

(58) Field of Classification Search
CPC ........ F16J 15/3204; F16J 15/164; H02K 5/14; H02K 5/124
See application file for complete search history.

(56) References Cited

U.S. PATENT DOCUMENTS 3,103,366 A * 9/1963 Dunn ..................... F16J 15/022
277/625
3,124,366 A * 3/1964 Hillman ................ F16J 15/022
277/614
(Continued)

FOREIGN PATENT DOCUMENTS

CN    103328821 A    9/2013
CN    105570290 A  * 5/2016  ............. B61F 15/26
(Continued)

OTHER PUBLICATIONS

Chinese Office Action corresponding to 201980076289.6 dated Jun. 21, 2022.
(Continued)

*Primary Examiner* — Eugene G Byrd
(74) *Attorney, Agent, or Firm* — Finch & Maloney PLLC

(57) ABSTRACT

A seal device (3) for a rotating shaft (1). The seal device has a shaft seal (4), a shaft grounding connection (6) and a holding feature (9) for holding the shaft seal (4) and the shaft grounding connection (6). The holding feature (9) has at least one opening (10), between the shaft seal (4) and the shaft grounding connection (6), for clearing particles away from the shaft seal (4) and the shaft grounding connection (6). An electric machine with a rotor shaft (1) that can be driven in rotation and with a seal device (3) of the above type for sealing the rotor shaft (1) and, therefore, also sealing an inside space of the electric machine. Furthermore, a drive unit for electrically driving a motor vehicle, including an electric machine of the above type for providing drive power of the drive unit.

15 Claims, 1 Drawing Sheet

(51) Int. Cl.
*H02K 5/124* (2006.01)
*H02K 5/14* (2006.01)

(56) References Cited

U.S. PATENT DOCUMENTS

| | | | | |
|---|---|---|---|---|
| 3,322,433 | A * | 5/1967 | Rentschler | B32B 27/00 |
| | | | | 525/104 |
| 3,346,266 | A * | 10/1967 | Bondroit | F16J 15/121 |
| | | | | 277/601 |
| 3,685,123 | A * | 8/1972 | Frisch | F16J 13/02 |
| | | | | 29/282 |
| 3,831,954 | A * | 8/1974 | Longfellow | F16L 21/03 |
| | | | | 285/918 |
| 4,477,223 | A | 10/1984 | Giroux | |
| 4,544,167 | A | 10/1985 | Giroux | |
| 4,619,458 | A | 10/1986 | Mitumaru | |
| 5,135,239 | A * | 8/1992 | Kato | F16J 15/028 |
| | | | | 277/648 |
| 5,580,068 | A * | 12/1996 | Gundy | F16J 15/022 |
| | | | | 277/615 |
| 7,005,774 | B2 | 2/2006 | Kuribayashi et al. | |
| 9,970,526 | B1 * | 5/2018 | Bortoli | F16H 57/038 |
| 10,359,114 | B2 * | 7/2019 | Seki | F16J 15/441 |
| 10,704,712 | B1 * | 7/2020 | Boulanger | F16L 23/22 |
| 10,857,666 | B2 * | 12/2020 | Procyshyn | B25J 18/04 |
| 2002/0053769 | A1 * | 5/2002 | Oiarbide Aseguinolaza | |
| | | | | F16L 17/073 |
| | | | | 277/602 |
| 2002/0106526 | A1 * | 8/2002 | Kuramoto | F16J 15/022 |
| | | | | 428/495 |
| 2005/0223536 | A1 * | 10/2005 | Botrie | F16J 15/14 |
| | | | | 29/527.2 |
| 2005/0285464 | A1 * | 12/2005 | Orders | H02K 11/40 |
| | | | | 310/239 |
| 2011/0062818 | A1 * | 3/2011 | Oh | H02K 11/40 |
| | | | | 310/228 |
| 2011/0204734 | A1 * | 8/2011 | Orlowski | H02K 5/10 |
| | | | | 310/85 |
| 2013/0033139 | A1 * | 2/2013 | Tones | H02K 5/124 |
| | | | | 310/90 |
| 2014/0001708 | A1 * | 1/2014 | Ewing | B29C 59/16 |
| | | | | 277/590 |
| 2014/0319905 | A1 * | 10/2014 | Mathew | F16J 15/3204 |
| | | | | 277/549 |
| 2015/0115535 | A1 * | 4/2015 | Trivedi | F16J 15/46 |
| | | | | 277/645 |
| 2016/0076650 | A1 * | 3/2016 | Armitage | F16J 15/0887 |
| | | | | 277/615 |
| 2017/0018984 | A1 * | 1/2017 | Rasinski | H02K 3/51 |
| 2017/0196110 | A1 * | 7/2017 | Shinn | F16J 15/022 |
| 2017/0261107 | A1 * | 9/2017 | Martin | F16J 15/441 |
| 2018/0045311 | A1 * | 2/2018 | Sander | F16J 15/02 |
| 2018/0051634 | A1 * | 2/2018 | Di Florio | F16J 15/021 |
| 2018/0056318 | A1 * | 3/2018 | Jackson | F16L 15/003 |
| 2018/0100545 | A1 | 4/2018 | Toyota et al. | |
| 2018/0216737 | A1 * | 8/2018 | Hellholm | B62D 33/067 |
| 2019/0032824 | A1 * | 1/2019 | McNamara | F16L 55/115 |

FOREIGN PATENT DOCUMENTS

| | | | | |
|---|---|---|---|---|
| DE | 25 40 010 A1 | 3/1977 | | |
| DE | 10 2016 207 672 A1 | 11/2017 | | |
| EP | 3 023 658 A1 | 5/2016 | | |
| EP | 3379667 A1 * | 9/2018 | | H02B 13/045 |
| GB | 2 219 475 A | 12/1989 | | |
| JP | 3083151 B2 * | 9/2000 | | |
| WO | WO-2013156851 A2 * | 10/2013 | | B25J 18/04 |
| WO | WO-2019210954 A1 * | 11/2019 | | F16J 15/3404 |
| WO | WO-2020043276 A1 * | 3/2020 | | B25J 17/00 |

OTHER PUBLICATIONS

German Search Report Corresponding to 10 2018 219 779.2 dated Oct. 10, 2019.
International Search Report Corresponding to PCT/EP2019/077695 dated Jan. 28, 2020.
Written Opinion Corresponding to PCT/EP2019/077695 dated Jan. 28, 2020.

* cited by examiner

SEAL DEVICE, ELECTRIC MACHINE, AND DRIVE DEVICE

This application is a National Stage completion of PCT/EP2019/077695 filed Oct. 14, 2019, which claims priority from German patent application serial no. 10 2018 219 779.2 filed Nov. 19, 2018.

FIELD OF THE INVENTION

The invention relates on the one hand to a seal device for a rotating shaft, and also to an electric machine with a seal device and a drive unit for electrically driving a motor vehicle having an electric machine.

BACKGROUND OF THE INVENTION

Seal devices for shafts are known as such, for example radial shaft seals or labyrinth seals. They prevent the escape of a gaseous or liquid fluid such as a lubricant in the area of the shaft.

From DE 10 2016 207 672 A1 a sealing system for a shaft is known, in which, besides the actual shaft seal, a shaft grounding ring is provided. An embodiment of that system comprises two shaft seals between which the shaft grounding ring is arranged.

SUMMARY OF THE INVENTION

The purpose of the present invention is to develop the prior art further.

This objective is achieved by the characteristics specified in the principal claim. Preferred embodiments emerge from the subordinate claims.

According to these a seal device for a rotating shaft is proposed, which seal device comprises a shaft seal and a shaft grounding connection and a holding feature for the shaft seal and the shaft grounding connection. In addition an electric machine with a rotor shaft that can be driven in rotation, having a seal device of the type for sealing the rotor shaft and thereby also sealing an inside space of the electric machine is proposed. Furthermore, a drive unit for electrically driving a motor vehicle is proposed, which comprises an electric machine of the type for the provision of a drive power of the drive unit. Such an electric machine converts electrical energy into a mechanical rotation movement, or conversely. As necessary, such an electric machine can be operated as an electric generator or as a motor. The electric machine is in particular a synchronous machine or an asynchronous machine.

The seal device proposed serves to seal the rotating shaft. For that purpose it comprises the shaft seal. It also comprises the shaft grounding connection. And it comprises the holding feature for holding and supporting the shaft seal and the shaft grounding connection. The holding feature has at least one opening in the area between the shaft seal and the shaft grounding connection. This opening serves on the one hand to discharge particles from the shaft seal, and on the other hand the opening serves to discharge particles from the shaft grounding connection. The at least one opening is thus designed to fulfill those functions. For that purpose the opening in particular leads radially away from the shaft seal and the shaft grounding connection.

Thus, by way of the opening not only are particles removed from the shaft seal, in particular such as particles generated by wear or leakage that has penetrated through the seal, but also particles from the shaft grounding connection, such as particles generated by the wear of a brush of the grounding connection. Furthermore this reduces the probability that particles from the shaft seal will make their way to the shaft grounding connection and there have a negative effect on the action of the grounding connection. This can in particular reduce its efficacy or increase its wear or leakage. Conversely, the probability is also reduced that particles from the shaft grounding connection will get to the shaft seal and there increase the wear of the shaft seal.

Such a shaft grounding connection is in particular understood to mean a structural element that produces a rotatable electrical connection between the shaft and an electrical reference potential. Such a reference potential is for example an electrical ground potential or an electrical 'ground'. Such a shaft grounding connection does not serve for electrical commutation. Preferably, the shaft grounding connection connects the shaft electrically to a housing or part of a housing in which the shaft is mounted and able to rotate. The shaft grounding connection comprises in particular at least one solid or flexible brush for making a sliding contact with the shaft. The shaft grounding connection is in particular in the form of a shaft grounding ring.

A shaft seal of the type concerned is in particular understood to mean a structural element designed to hold back the fluid in the area of the shaft. Such shaft seals are already known as such, for example in the form of radial shaft seals or labyrinth seals.

Preferably, the at least one opening is arranged in such manner that in the correctly fitted position of the seal device the opening is under the shaft seal and/or a brush of the shaft grounding connection. In that way, during the normal, intended use of the seal device the particles from the shaft seal and/or the shaft grounding connection will fall under gravity through the opening and will be easily cleared away.

Preferably, the holding feature is in the form of a housing section of a housing. This, in particular, is the part of the housing in which the shaft is rotatably mounted. The part of the housing can be a separate component or it can be an integral part of the rest of the housing. The housing section is formed in particular by a specially designed feature of the housing. The housing section can have one or more thickened portions which hold the shaft grounding connection and the shaft seal. The at least one opening can be formed by a cut-out in the thickened portion or thickened portions. Thus, the holding feature can be of simple design.

Preferably, the housing section is formed by such a local thickened part of the housing that surrounds the shaft in a ring shape. In that case the housing section can have a plurality of openings distributed around the circumference of the thickened portion. For example, three openings can be provided, which are distributed around the circumference of the thickened portion. Preferably, in the correctly assembled condition one of the openings is positioned under the shaft seal and/or the brush of the shaft grounding connection. In this respect too the holding feature can be of simple design.

The housing section can have a rib which surrounds the at least one opening or—if more such openings are present—all the openings continuously and radially. In that way a further radial spreading of the particles can be prevented. The rib can form part of a reservoir for the particles cleared away through the opening.

Preferably, on the housing section a bearing is also provided, in which the shaft is rotatably mounted on the housing. This makes for a compact structure.

Preferably, the opening leads into a reservoir for the particles. In that way the particles cleared away fall directly into the reservoir and blocking of a pipe leading the particles into the reservoir, such as a tube or duct, is therefore excluded.

The seal device also preferably comprises a collecting device for the contactless removal of any leakage from the shaft that makes its way through the shaft seal. Thus, in addition to the shaft seal and the shaft grounding connection with the opening between them, the collecting device is also provided. This collecting device works in a contactless manner. Thus, no additional components such as sealing lips, brushes or anything else that is in contact with the shaft and therefore performs frictional work is required in order to wipe the leakage away from the shaft. Such a collecting device works virtually without causing any wear and results in only minimal friction losses. An environment beyond the seal device is thereby kept as free from the leakage as possible.

In this connection a leakage that passes through the shaft seal is in particular understood to mean a volume flow of a fluid that the shaft seal should indeed hold back, but which, for various reasons, undesirably seeps through the shaft seal. For example such a leak occurs if there is a sufficiently large gap between the shaft seal and the shaft, so that the fluid can there flow through along the shaft. Such a fluid can in particular be a liquid, especially a lubricant. Depending on the particular application of the seal device, it can however also be some other fluid such as a coolant.

The collecting device works in particular by producing a centrifugal force that acts upon the leakage. This occurs when the shaft is rotating. A local enlargement of the diameter (thickening) of the shaft provided for the collecting device causes the leakage to move radially outward due to the rotation of the shaft. This takes place to an extent such that due to the centrifugal force that occurs during rotation, the leakage is detached from the shaft and captured and cleared away by the rest of the collecting device. Alternatively or in addition, the leakage can be drawn off the shaft without contact by producing an underpressure at the collecting device.

The collecting device itself can form the reservoir for collecting the captured and discharged particles or leakage. Or else, the collecting device can lead into the reservoir or at least it can lead into a pipe which conveys the leakage to the reservoir.

Preferably, the collecting device is in the form of a shoulder arranged on the shaft and a collecting structure that surrounds the shoulder radially. Such a shoulder forms on the one hand a local thickening of the shaft and on the other hand a breakaway edge for the leakage. Thus, already at a relatively low rotation speed of the shaft the leakage is detached from and flung off the shaft. In this case the shoulder is provided in order to detach the leakage from the shaft, whereas the collecting structure is provided for the actual capturing and clearing away of the leakage detached by means of the shoulder. The breakaway edge can have a suitable shape for the leakage to be particularly effectively detached from it. In particular, the breakaway edge can have a sharp edge or a burred edge (i.e. one with burrs).

The shoulder arranged on the shaft can be formed either by a shoulder of the shaft or by a component fixed on the shaft and surrounding the shaft radially. Such a shoulder is formed by the shaft itself, i.e. by giving the shaft itself an appropriate shape, for example by means of a machining process. A component that surrounds the shaft radially can be for example a separate ring which is press-fitted onto the shaft or fixed on it in some other way. This component then forms the thickened area on the shaft with the breakaway edge. In that way the part of the collecting device provided in order to detach the leakage from the shaft can be made in a simple and inexpensive manner.

Preferably, the collecting structure which surrounds the shaft radially is formed by the housing section or by the housing. For example, the collecting structure can be a special cast structure in the housing section or housing formed during a casting process. However, it can also be produced in the housing in some other way. Alternatively, the collecting structure can also be designed to be fixed onto the housing section or housing, for example by screwing, welding, pressing or adhesive bonding. In that case the housing section or housing on the one hand and the collecting structure on the other hand are separate parts. The collecting structure is preferably made of sheet metal or plastic. In that way it can be produced simply and inexpensively.

Preferably, in a radially inner area the collecting structure has a bent-over part such that a radially inner end of the collecting structure is pot-shaped and is directed toward the shaft shoulder. This prevents the leakage flung off upward, which flows along the collecting structure in the direction of the shaft, from dripping back down onto the shaft. Instead, this part of the leakage flows along the pot shape of the collecting structure around the shaft.

Preferably, the shaft seal and the shaft grounding connection and the collecting device are arranged axially one behind another. Here, the axial direction is understood to be the direction along the rotational axis of the shaft. In this case the shaft grounding connection can be arranged between the shaft seal and the collecting device. In that way the collecting device can also capture the wear from the shaft grounding connection. Alternatively, the collecting device can be arranged axially between the shaft seal and the shaft grounding connection. Then, the shaft grounding connection lies beyond the shaft seal and the collecting device, and it therefore does not come into contact with the leakage, or hardly at all so. The position of the opening can then be chosen at a suitable point axially between the shaft seal and the shaft grounding connection.

It can be provided that the shaft grounding connection is arranged on the collecting structure. In other words the shaft grounding connection is supported by the collecting structure. In that way the shaft is connected to the electrical reference potential in the area of the collecting structure. Thus, the collecting structure can itself be part of the electrical connection between the shaft and the electrical reference potential. The collecting structure and the shaft grounding connection can therefore form a unit that can be mounted conjointly.

The breakaway edge of the shaft shoulder can be arranged axially between the shaft seal and the shaft grounding connection. That prevents leakage of the shaft seal from getting to the shaft grounding connection. This can also be done when the shaft grounding connection is arranged on the collecting structure.

The electric machine proposed has a rotor shaft that can be driven in rotation. In particular, the rotor shaft is connected to a rotor of the electric machine, including the case when the rotor and the rotor shaft are made integrally as one piece. The rotor and hence also the rotor axis can in particular rotate relative to a stator of the electric machine fixed to the housing. The electric machine comprises a seal device for sealing the rotor shaft. The seal device of the electric machine is in the form of the proposed seal device.

Thus, in a simple manner a possible leak into the interior (inside space) of the electric machine from the rotor shaft can be captured.

Preferably, the electric machine has an inside space in which the rotor connected to the rotor shaft is arranged and able to rotate. At the seal device the rotor shaft projects out of the inside space. Thus, the seal device seals the inside space of the electric machine, against the rotor shaft, relative to the outside. The collecting device (when present) and the shaft grounding connection, and the proposed opening in the seal device, are then arranged within the inside space of the electric machine, in particular close to the shaft seal. This prevents any fluid from outside from getting into the inside space of the electric machine and being distributed there in an uncontrolled manner. At the same time, the shaft is electrically connected to the electrical reference potential.

The drive unit proposed serves for electrically driving a motor vehicle. Accordingly, the drive unit comprises an electric machine for providing drive power for the motor vehicle. The drive unit can in particular be in the form of a drive module, and can be designed to be arranged on a driven axle of the motor vehicle. The electric machine of the drive unit is in the form of the proposed electric machine and therefore comprises the proposed seal device.

BRIEF DESCRIPTION OF THE DRAWINGS

Below, the invention is explained in greater detail with reference to figures from which further preferred embodiments and features of the invention emerge. In schematic form, the figures show.

DETAILED DESCRIPTION OF THE PREFERRED EMBODIMENTS

In the figures the same or at least functionally equivalent components or elements are denoted by the same indexes.

Figure 1:
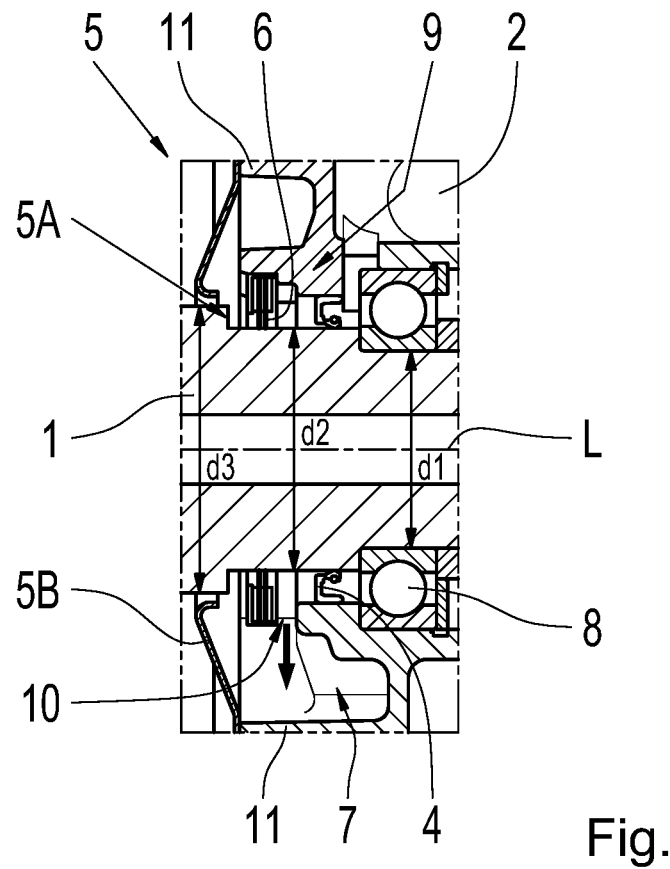
FIG. 1: A partial view of a longitudinal section through an electric machine in the area of a seal device.

FIG. 1 shows part of a longitudinal section through an electric machine in the area of an axial end of the electric machine. In this area a rotor shaft 1 of the electric machine that can rotate about a rotational axis L passes through a housing 2 of the electric machine. To seal an inside space of the electric machine in the area of the shaft 1, a seal device 3 is provided. The seal device 3 comprises a shaft seal 4, in this case for example a radial shaft seal, and axially a distance away from it a shaft grounding connection 6, in this case for example a shaft grounding ring. In FIG. 1 the inside space of the electric machine is to the left of the shaft seal 4.

The shaft seal 4 and the shaft grounding connection 6 are held in position by a holding feature 9 of the seal device 3. In the present case the holding feature 9 is in the form of a housing section of the housing 2. This holding feature has at least one opening 10, which is arranged axially relative to the rotational axis L between the shaft seal 4 and the shaft grounding connection 6. The opening 10 leads radially away from the shaft seal 4 and the shaft grounding connection 6 and serves on the one hand to clear away particles from the grounding connection 6 and on the other hand to clear away particles from the shaft seal 4. In FIG. 1 this is indicated by a downward arrow by the opening 10.

The shaft seal 4 is intended to prevent the ingress of any fluid, in particular a lubricant, into the inside space of the electric machine. It can happen that some leakage passes through the shaft seal 4 and flows along the holding feature 9 axially in the direction of the shaft grounding connection 6 within the inside space. This leakage reaches the opening 10, which diverts it downward directly into a reservoir 7. Thus, the opening 10 is arranged so that when the seal device 3 is fitted correctly, the opening is positioned under the shaft seal 4. The opening 10 is also under a brush of the shaft grounding connection 6, so that particles worn off the latter also fall down through the opening 10 directly into the reservoir 7.

As shown in FIG. 1 the seal device 3 also comprises an optional collecting device 5. Namely, it can also happen that some leakage passes through the shaft seal 4 and flows along the shaft 1 into the inside space of the electric machine. In that case the leakage does not normally reach the opening 10, but is prevented from spreading further in the inside space by the collecting device 5. This can therefore also be called a leakage collecting device. In the example embodiment shown, the collecting device 5 consists of a shaft shoulder 5A on the shaft 1 and a collecting structure 5B fixed onto the housing 2. The collecting structure 5B surrounds the shoulder 5A radially but is not in contact with it. Thus, the collecting structure 5B works in a contactless manner. The collecting structure 5B illustrated consists, for example, of sheet metal or plastic. The shoulder 5A forms a breakaway edge for any leakage that has passed through the shaft seal 4 into the inside space of the electric machine.

When the shaft 1 rotates about the rotational axis L and during this a leak occurs at the shaft seal 4, the leakage gets to the shoulder 5A. There, it is diverted along the shoulder 5A radially outward to the breakaway edge of the shoulder 5A. The breakaway edge, in combination with the centrifugal force acting upon the leakage at that point, causes the leakage to become detached from and flung off the shoulder 5A. The flung-off leakage is captured by the collecting structure 5B and passed into the reservoir 7. In the example embodiment shown, the reservoir 7 is formed by the housing section which also forms the holding feature 9. Alternatively, the reservoir 7 can be formed by the collecting structure 5B itself.

In the radially inner area (i.e. in the area close to the shaft 1), the collecting structure 5B is bent over so that the radially inner end of the collecting structure 5B is pot-shaped and extends parallel to the shaft 1 toward the shoulder 5A. Leakage which is flung upward and there captured by the collecting structure 5B thus flows along the collecting structure 5B and the pot shape into the reservoir 7, without dripping back down onto the shaft 1. As can be seen in FIG. 1, the collecting structure can otherwise be saucer-shaped.

The shaft grounding connection 6 serves to form a permanent electrical connection between the shaft 1 and the housing 2 as the electrical reference potential. In that way the bearings 8 for mounting the shaft 1 in the housing 2 are protected against damage that can occur due to electrical potential differences at the bearings 8.

Relative to a rotational axis L of the shaft 1, the shaft grounding connection 6 is arranged between the collecting device 5 and the shaft seal 4. These elements 4, 5 and 6 are directly adjacent to one another. However, in a different configuration the collecting device 5 could be arranged axially between the shaft grounding connection 6 and the shaft seal 4. In this, the opening 10 is always at a suitable point between the shaft seal 4 and the shaft grounding connection 6.

Axially close to the shaft seal 4 and outside the inside space of the electric machine is the bearing 8 for the rotatable mounting of the shaft 1 in the housing 2, in this case for example in the form of a deep-groove ball bearing. The bearing 8 is also arranged on the holding feature 9 that forms part of the housing.

The bearing 8 is arranged on a first diameter d1 of the shaft 1. The shaft seal 4 and the shaft grounding connection 6 are arranged on another, second diameter d2 of the shaft 1. The shoulder 5A forms another, third diameter d3 of the shaft 1. In this case $d1 < d2 < d3$.

Figure 2:
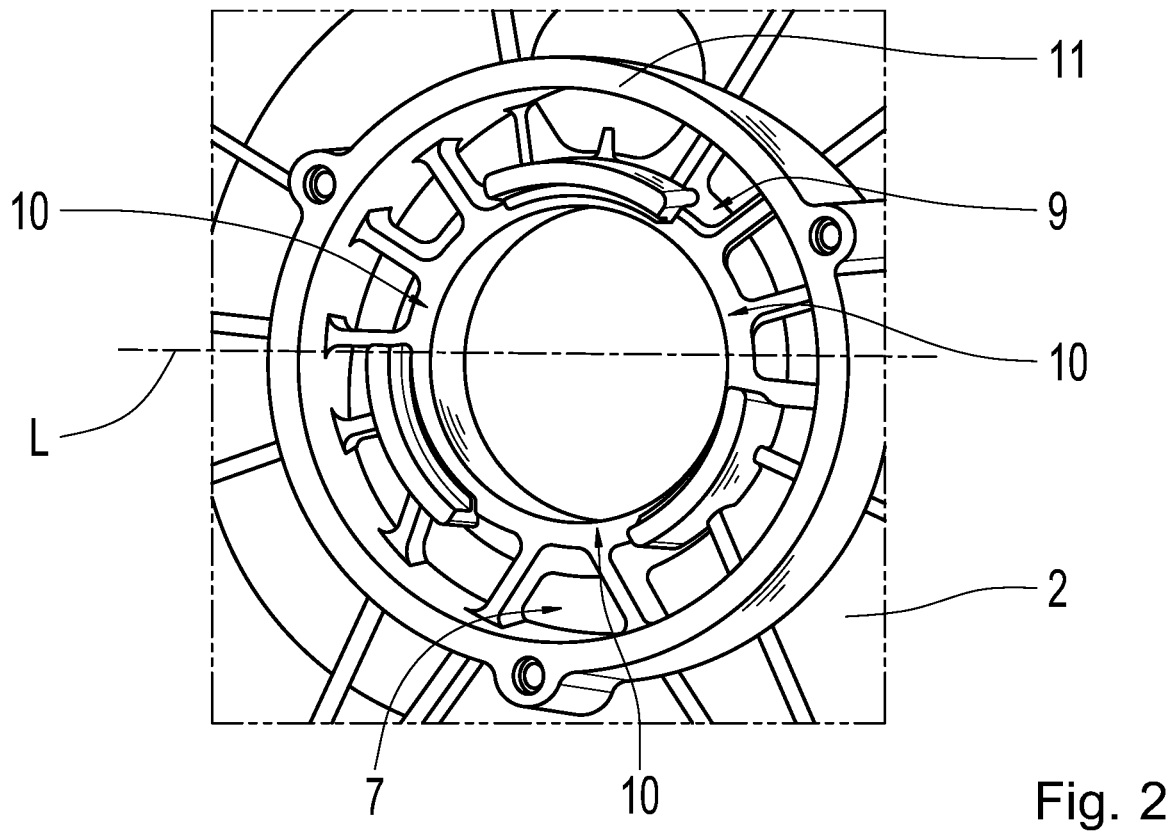
FIG. 2: A partial three-dimensional view from above, of a holding feature of a seal device.

FIG. 2 shows as an example, a three-dimensional view of the holding feature 9 that forms part of the housing for holding the shaft seal 4 and the shaft grounding connection 6. The holding feature 9 is in the form of a local, annular thickened portion of the housing 2, which directly supports the shaft seal 4 and the shaft grounding connection 6. This thickened portion surrounds the shaft 1 indicated by the rotational axis L, which passes through the circular opening that can be seen in FIG. 2 on the inside of the holding feature 9. Around the circumference of the thickened portion are distributed a plurality of radial openings 10. These serve in each case to clear away particles from the shaft seal 4 (here, particularly in the form of leakage) and to clear away particles from the shaft grounding connect ion 6 (here, particularly in the form of wear particles).

The holding feature 9 also comprises a rib 11 (see also FIG. 1) which is arranged continuously around the rotational axis L. In this, accordingly, no radial opening is provided. The rib 11 prevents any further radial spreading of the particles discharged through the openings 10. These collect in the lower area of the rib 11. Thus, the rib 11 forms the lower edge of the reservoir 7.

The rib 7 has attachment points for fixing the collecting structure 5B. In FIG. 2 the attachment points are, as an example, in the form of threaded bores. To these can be screwed the saucer-shaped collecting structure 5B, which is made from sheet metal or plastic. However, there are other possible ways to attach the collecting structure 5B, for example by welding, riveting or clipping it firmly in place.

In an alternative embodiment it can be provided that the shaft grounding connection 6 is arranged on the collecting structure 5B and there connects the shaft 1 electrically to the housing 2. In that case therefore, the electrical connection takes place by way of the shaft grounding connection 6 and the collecting structure 5B.

INDEXES

1 Rotor shaft, shaft
2 Housing
3 Seal device
4 Shaft seal
5 Collecting device
5A Shaft shoulder
5B Collecting structure
6 Shaft grounding connection
7 Reservoir
8 Bearing
9 Holding feature
10 Opening
11 Rib
d1 Shaft diameter
d2 Shaft diameter
d3 Shaft diameter
L Rotational axis

The invention claimed is:

1. A seal device for a rotating shaft, the seal device comprising:
   a shaft seal,
   a shaft grounding connection,
   a holding feature for holding the shaft seal and the shaft grounding connection,
   the holding feature having at least one opening, between the shaft seal and the shaft grounding connection, for clearing particles away from the shaft seal and the shaft grounding connection, and
   the seal device comprises a collecting device for contactless removal of any leakage from the shaft that passes through the shaft seal.

2. The seal device according to claim 1, wherein the opening is arranged such that the opening, in a correctly assembled position of the seal device, is at least one of under the shaft seal and under a brush of the shaft grounding connection.

3. The seal device according to claim 1, wherein the holding feature is formed by a housing section of a housing.

4. The seal device according to claim 3, wherein a bearing is provided on the housing section, and the bearing rotatably supports the shaft in the housing.

5. The seal device according to claim 3, wherein the housing section is formed by a locally thickened portion of the housing that surrounds the shaft in a ring shape, with a plurality of openings distributed around a circumference of the locally thickened portion.

6. The seal device according to claim 1, wherein the at least one opening leads to a reservoir for the particles.

7. The seal device according to claim 1, wherein the collecting device is in a form of a shoulder arranged on the shaft and a collecting structure that surrounds the shoulder radially.

8. The seal device according to claim 7, wherein the shoulder is formed either by a shoulder of the shaft itself, or by a component which is fixed onto the shaft and radially surrounds the shaft.

9. The seal device according to claim 7, wherein the collecting structure is made of either sheet metal or plastic.

10. The seal device according to claim 1, wherein the shaft seal, the shaft grounding connection and the collecting device are arranged one behind another.

11. The seal device according to claim 10, wherein the shaft grounding connection is arranged axially between the shaft seal and the collecting device.

12. The seal device according to claim 10, wherein the collecting device is arranged axially between the shaft seal and the shaft grounding connection.

13. The seal device according to claim 7, wherein the shaft grounding device is arranged on the collecting structure of the collecting device.

14. An electric machine with a rotor shaft that can be driven in rotation and with a seal device for sealing the rotor shaft, wherein the seal device is configured according to claim 1.

15. A drive unit for electrically driving a motor vehicle, comprising an electric machine for provision of drive power from the drive unit, wherein the electric machine is designed in accordance with claim 14.

* * * * *